United States Patent

[11] 3,597,538

[72] Inventor Zvi Binenbaum
736 Crown St., Brooklyn, N.Y. 11213
[21] Appl. No. 818,696
[22] Filed Apr. 23, 1969
[45] Patented Aug. 3, 1971

[54] MEANS FOR TRANSMITTING STENOTYPE PRODUCED INPUT
5 Claims, 4 Drawing Figs.

[52] U.S. Cl. .......... 178/17.5, 178/21, 197/9
[51] Int. Cl. .......... B41t 3/26, H041 13/08, H041 17/00
[50] Field of Search .......... 178/17.5, 21, 50; 179/15.55, 15 AT, 15 BS; 340/347; 197/9, 11

[56] References Cited

UNITED STATES PATENTS 3,099,004 7/1963 Heuer .......... 340/347
3,396,382 8/1968 Jones .......... 340/347
3,453,387 7/1969 Bagley .......... 178/17.5

*Primary Examiner*—Kathleen H. Claffy
*Assistant Examiner*—William A. Helvestine
*Attorney*—Hubbell, Cohen & Stiefel

ABSTRACT: Apparatus is provided for the real time communication of data generated by a Stenotype keyboard, a type of data typically represented by the simultaneous actuation of one or more keys. The key actuations are recorded by storage devices, and commutation equipment is activated once for each stenographic character to sample the storage devices sequentially and transmit the information in bit serial form over a data link. The commutating device is started by a control circuit primed when one or more keys are depressed, and subsequently actuated when all such keys are released. At the conclusion of a single commutation cycle, the control circuit stops the commutating device. At the other end of the data link is a decoder which converts the bit serial data transmission back into a form which can be understood by a Stenotype readout device at a remote location.

INVENTOR
ZVI BINENBAUM
BY [signature]
ATTORNEYS.

INVENTOR
ZVI BINENBAUM
BY
ATTORNEYS.

INVENTOR
ZVI BINENBAUM
BY
Sandoe, Hopgood & Calimafde [signature]
ATTORNEYS.

MEANS FOR TRANSMITTING STENOTYPE PRODUCED INPUT

FIELD OF THE INVENTION

This invention relates to digital data transmission, and is particularly applicable to the problems of relaying stenotype data to remote locations.

THE PRIOR ART

Machine stenography, particularly the variety known under the trademark Stenotype, has a number of advantages over manual stenography, one of which is the fact that it can be read by someone other than the stenographer. This being the case, machine generated stenography raises the possibility that one person can record the material at one location while a different person can transcribe it simultaneously at another location for ultrafast copy. In legal proceedings, for example, such ultrafast copy is often highly desirable to the participants. Accordingly, there is a need for transmission apparatus which is capable of relaying machine-generated stenographic data on a real time basis to a remote location for concurrent or delayed transcription.

A problem is encountered in the design of such apparatus, however, owing to the fact that most telephone line data transmission systems are designed for bit serial operation. Transmission in bit parallel form would require as many lines as there are bits per word. Focusing our attention specifically on Stenotype data, we find that the keyboard of such a machine comprises 25 keys which are depressed simultaneously in various combinations to form stenographic characters which represent units of speech. Thus, in the data communication engineer's parlance, each Stenotype character is a "word" consisting of 25 bits of binary data. Since one or more keys are frequently depressed simultaneously to represent such a "-word," the Stenotype keyboard inherently generates such data in bit parallel form. But to transmit the data in that form would require 25 telephone lines, which is impractical and prohibitively expensive.

SUMMARY AND OBJECTS OF THE INVENTION

In general terms, it is the object of this invention to provide apparatus which accepts data generated by simultaneously actuated keys and transmits it over a conventional telephone link. More specifically, it is an object of this invention to provide apparatus which converts Stenotype data from bit parallel to bit serial form for transmission over a conventional data link. Another important object is to provide a Stenotype datatype transmission system, including a decoder at the receiving end which reconverts the data back into a form usable for transcription at a remote location.

In carrying out this invention a Stenotype keyboard, or any other keyboard of the kind in which at least some of the keys are operable simultaneously, operates a plurality of switches, at least one switch for each key. The switch actuations are recorded by storage means, and the storage means are connected to a data transmission output port in time sequential fashion by commutating means. In order to synchronize the operation of the commutating device properly with the manual actuation of the keyboard, means are responsive to actuation of at least one of the keys, followed by release of all the keys so actuated, to start the commutating means. Additional means are provided for thereafter stopping the commutating means at the end of a single cycle of commutation covering all of the storage means.

BRIEF DESCRIPTION OF THE DRAWINGS

The same reference characters refer to the same elements throughout the several views of the drawing.

DETAILED DESCRIPTION OF THE PREFERRED EMBODIMENTS

Figure 1:
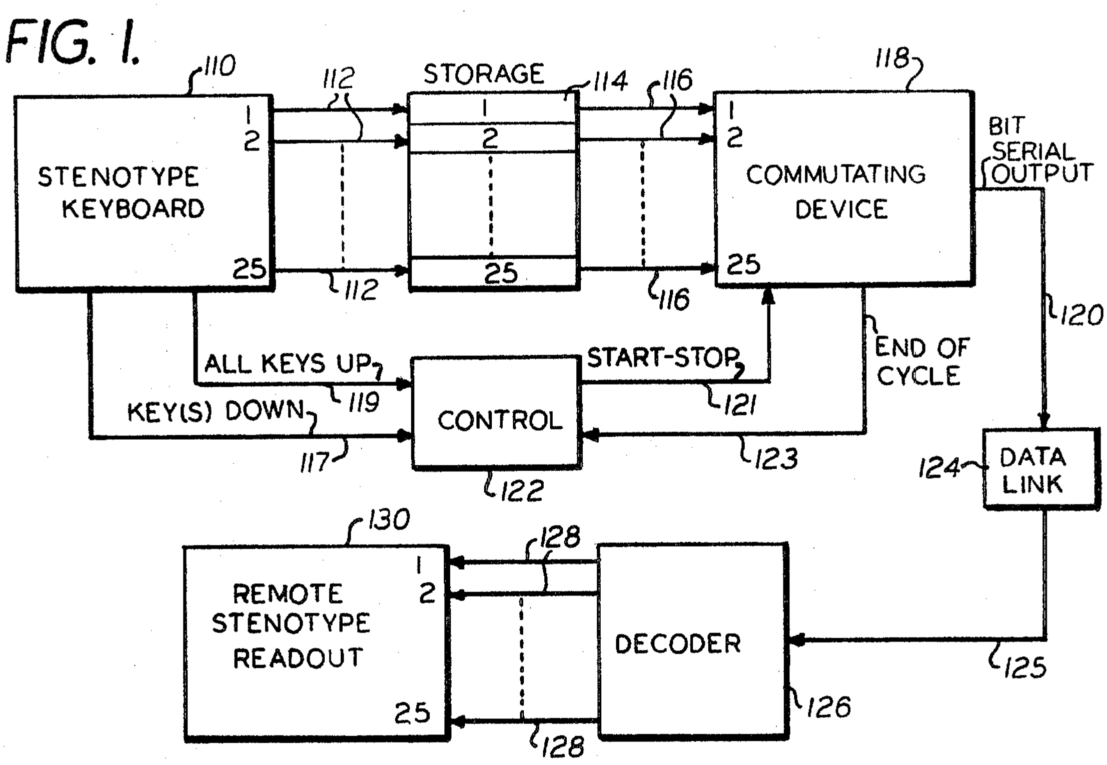
FIG. 1 is a block diagram schematically illustrating the functional organization of a Stenotype data communication system in accordance with this invention.

In general terms, the Stenotype data communication system of this invention comprises a conventional Stenotype keyboard 110 having the usual 25 keys, one or more of which are normally depressed simultaneously to generate a Stenotype character representing a unit of speech. Each of the keys of the keyboard 110 closes an electrical switch when the key is manually depressed, and these switches are connected by individual electrical leads 112 to respective stages of a storage device 114. Each stage in turn is connected by an individual electrical lead 116 to a commutating device 118 which scans the leads 116 in sequence to produce a bit serial output on a single lead 120. Of course, if a binary to decimal conversion is interposed in the system between the storage device 114 and the commutating device 118, fewer lines 116 than required by the one to one relationship of FIG. 1 will be needed.

A control device 122 starts and stops the commutator 118 at the appropriate time. The control device detects when one or more of the keys of the Stenotype keyboard 110 are depressed at the start of a Stenotype character (line 117), followed by the release of all of the depressed keys at the conclusion of the character (line 119). At that point the control circuit 122 starts the commutating device 118 (line 121) on a cycle of commutation covering all the twenty-five leads 116. The commutating device 118 advises the control circuit 122 when it has reached the end of a single commutating cycle (line 123), whereupon the circuit 122 shuts off the commutator 118 (line 121) until the next Stenotype character is formed.

The bit serial output on lead 120 is communicated to a conventional data link 124, for example, telephone equipment designed for the transmission of binary digital information. It is received at a remote location by a decoder 126 which reconstitutes the bit serial signal arriving over the line 125 into the 25 individual bits handled by Stenotype devices. The decoder than communicates these over respective leads 128 to a remote Stenotype readout device 130, for example a Stenotype printer. As a result, a transcriber at the remote location can immediately read and transcribe the output of printer 130 to produce copy concurrently with the proceedings which are being stenographically recorded on the keyboard 110.

Clearly, if it is desired to speed up the transmission, rather than using a single line 120 for transmission and commutating 25 bits of information for serial input into that single line, a plurality of parallel lines 120 could be employed with a like plurality of commutators. Thus, for example, if three transmission lines 120 were used, three eight-bit commutators could provide the input thereto and commutation and transmission would be cut to one-third.

Figure 4:
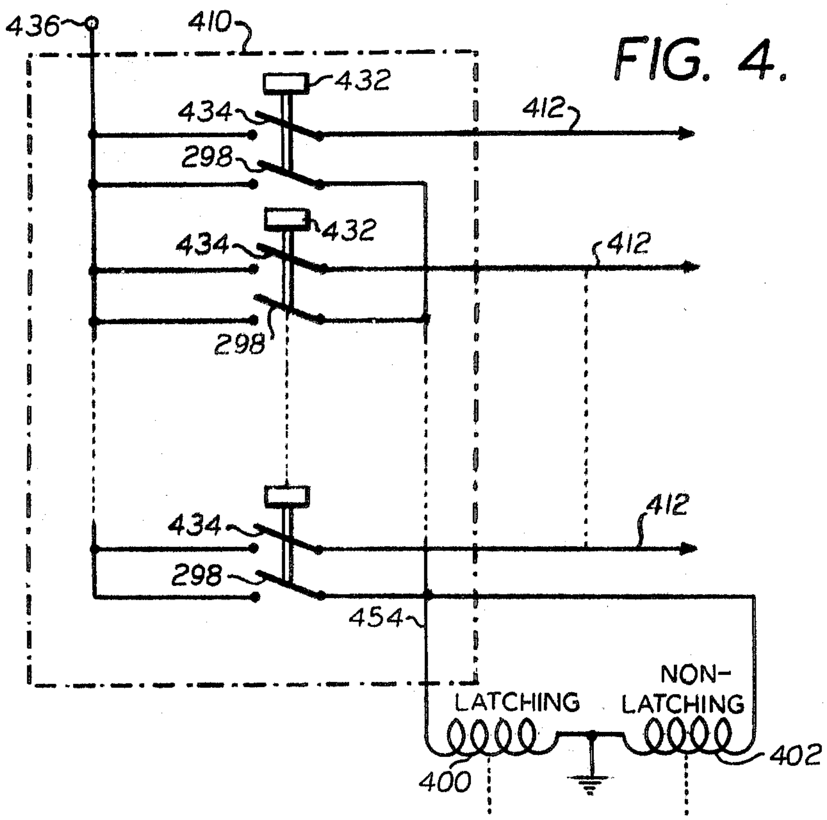
FIG. 4 is a fragmentary schematic electrical circuit diagram illustrating a portion of still another alternative embodiment of a data communication system according to this invention.
Figure 2:
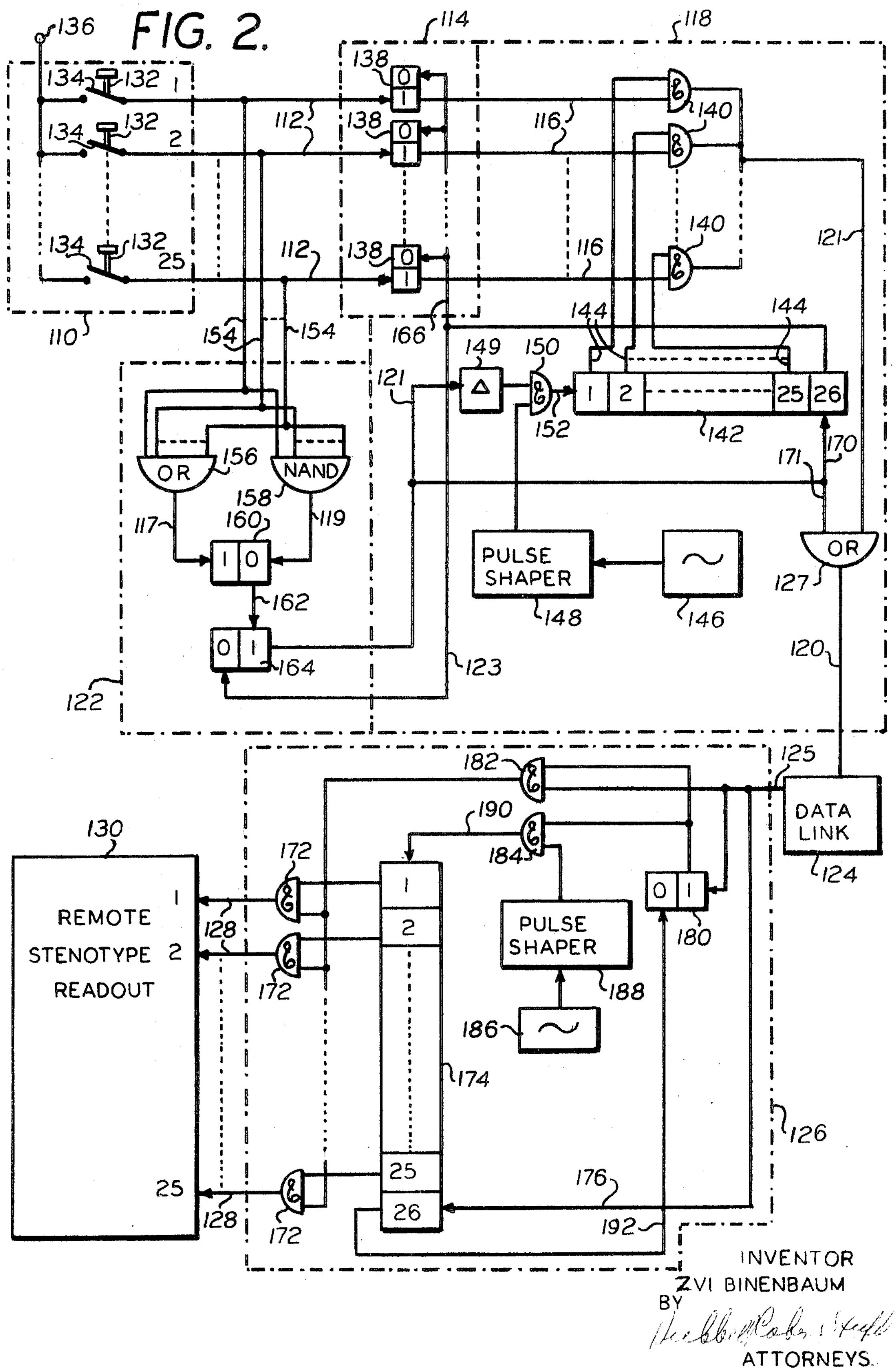
FIG. 2 is a logic diagram schematically illustrating one particular embodiment of such a Stenotype data communication system.

The Stenotype data communication system just generally described may take any number of specific forms, a few of which will now be described in greater detail in connection with FIGS. 2 through 4. In FIG. 2 the Stenotype keyboard 110 includes 25 manually actuated keys 132 which operate respective electrical switches 134. The depression of any key 132 closes the associated switch 134 to connect a voltage source terminal 136 to the associated conductor 112 leading to the storage device 114. The latter includes 25 individual flip-flops 138 which are connected to be set by respective input leads 112. Thus, when one or more of the keys 132 are depressed, energizing a corresponding group of one or more leads 112 to set a corresponding group of one or more flip-flops 138, that group of flip-flops then stores a particular Stenotype character representing a unit of speech.

The leads 116 connect the respective set outputs of the flip-flops 138 to respective coincidence gates 140 of the commutating circuit 118. The outputs of all these coincidence gates are connected in common to the lead 121 which goes via OR gate 127 and lead 120 to the data link 124. In order to transmit in sequence each of the 25 binary bits of data stored in the flip-flops 138, the gates 140 must be enabled sequentially. That operation is performed by a shift register 142 having at least 25 and preferably 26 stages. Stages 1 through 25 of the shift register have respective output leads 144 which are connected to enable respective gates 140 in sequence as the shift register is advanced. A stream of pulses for advancing the shift register 142 in the required manner is provided by a free-running oscillator 146, the output of which is applied through a pulse shaper 148 and a coincidence gate 150 to a lead 152 connected to the advancing input of the register.

Stenotype transmission presents a particular problem to the data communication art, in that it can never be predicted in advance exactly how many of the keys 132 will have to be depressed simultaneously to form the next Stenotype character corresponding to the next speech unit of the recorded proceedings. Such characters may be represented by various patterns of keys 132 ranging from one to 10 in number. Yet the system must operate flawlessly under any and all operating conditions required by the Stenotype environment. Therefore the commutator 118 must not start sampling the leads 116 immediately upon the first depression of any key 132, because there is the possibility that nine more keys man remain to be depressed. Obviously it is too much to expect of any human Stenotype operator, particularly when racing to keep up with oral proceedings, that all the keys 132 of any combination be depressed at exactly the same instant.

The commutator 118 must begin its cycle of sampling the leads 116 upon the release of all the keys 132 which have been depressed, because that is the event which signals that the formation of a Stenotype character has been completed to the satisfaction of the stenographer. It is at this time that the coincidence gate 150, which controls the passage of the advancing pulses to the advancing lead 152 of the shift register 142, is enabled by the control circuit 122. Then at the end of a single commutation cycle of the circuit 118, i.e., when it has sampled all 25 of the leads 116, the control circuit 122 must shut off the commutator 118 by disabling the coincidence gate 150.

Furthermore, once the commutator 118 has been shut off, if all the keys 132 remain released, this must not be interpreted as a signal to start the next commutation cycle. This simply means that the stenographer for some reason is waiting before recording the next stenographic character. Accordingly, the commutation circuit 118 must not respond merely to the released condition of the keys 132; rather it must respond only when one or more of these keys are redepressed and subsequently rereleased. Therefore, the control circuit 122 must in some way distinguish between mere inactivity of the keys 132, which does not have data significance, and the release of the keys 132 subsequent to actuation, which does have data significance.

In order to sense the condition of the keys 132, leads 154 are connected to the respective leads 112 controlled by the key-actuated switches 134. The leads 154 in turn branch off to a pair of gates 156 and 158, each of the 25 leads 154 being represented both at the input to gate 156 and at the input to gate 158.

Gate 156 is a logical OR gate which produces an output on line 117 when any one or more of the switches 134 are closed by the associated key or keys 132. When this happens an impulse is transmitted over line 117 to set a flip-flop 160. This event in itself does not turn on the commutator circuit 118, but is the first of a sequence of events accomplishing that function.

When all the keys 132 which were previously actuated are released at the end of a stenographic character, this triggers a response on the part of gate 158, a negative AND (or NAND) gate which responds to the absence of all inputs on leads 154. Then this gate issues an output on line 119 which resets the flip-flop 160. Note that the conditions for an output from gate 158 are satisfied even when the Stenotype keyboard 110 is not in use or when the stenographer is waiting waiting to hear the next speech unit to be recorded. But under those circumstances, the resulting output on line 119 is ineffective to switch the flip-flop 160, because it is already in the reset condition. The output on line 119 can reset the flip-flop 160 only when it has previously been set by the output on line 117 at the start of a stenographic character.

Upon the switching of the flip-flop 160 from the set to the reset condition, a step wave front from the reset output of the flip-flop appears on line 162 to set a flip-flop 164. The resulting set output from the latter flip-flop appears on line 121 and enables the gate 150 by means of a delay stage 149, so that the oscillator 146 and pulse shaper 148 are then able to advance the shift register 142. In advancing from stage 1 through stage 25, the register 142 enables the 25 gates 140 in sequence so as to gate out the 25 bits of a stenographic data character sequentially over lines 121 and 120 to the data link 124. Subsequently the data register 142 advances to stage 26 thereof, and in so doing energizes a line 166 which resets all the data storage flip-flops 138 of device 114. When shift register stage 26 turns on it applies a step wave front to line 123 which is effective to reset the flip-flop 164.

The flip-flop 164 is merely one form of bistable device which can assume a first condition to turn on the commutator 118, and then go back to the opposite condition to turn off the commutator circuit. Note further than the commutator circuit 118, specifically by means of stage 26 of shift register 142, advises the control circuit 122 of the completion of a full 25 bit commutation cycle by resetting the flip-flop 164.

However the flip-flop 160 prevents flip-flop 164 from being set to start a commutation cycle in response to any single event, and allows it to be set only in response to a sequence of events. Thus the flip-flop 160 is in effect a latch which switches the flip-flop 164 only at the moment when it is unlatched (reset). Therefore, element 160 must first be latched, i.e., set, by the signal on line 117 when one or more keys 132 are actuated. Subsequently it is unlatched, i.e., reset, to start a commutation cycle when those keys are all released.

In this type of commutation circuit 118 there is a possibility that the shift register 142 may somehow come out of synchronization with the keyboard 110. For example if the shift register, instead of stopping on stage 26 at the end of a commutation cycle, were advanced to stage 2 by a couple of extra noise pulse appearing on lead 152, then the next stenographic character transmission over data link 124 would comprise bits 2 through 25, omitting bit 1. Since the number and order of bits has data significance to the decoder 126, this would result in the transmission of nonsensical or erroneous data. Accordingly, the set output of flip-flop 164 is connected to a lead 170 which at the beginning of each character transmission forces the shift register 142 directly to stage 26 thereof, and by cross coupling turns off any other stage which might have been on. The function of circuit 149, it will now be appreciated, is to delay the enabling of gate 150 and the start of the commutation cycle until after the shift register 142 has been driven to stage 26.

The set output of the flip-flop 164 is also applied over a lead 171 to the OR gate 127 and is transmitted over line 120 to the data link 124. Consequently, at the beginning of each stenographic character transmission a pulse from the set output of that flip-flop is the first one transmitted over the data link. This first pulse comprises a "beginning of frame" signal which is then transmitted over lead 125 to the decoder 126 at the receiving location, to advise the decoder that a stenographic character transmission is about to begin.

When the "beginning of frame" signal is received, the first function it performs is to make sure that stage 26 of shift register 174 is activated, so as to synchronize with shift register 142 of the commutator 118. This accomplished by applying the "beginning of frame" pulse over a lead 176 which is connected to turn on stage 26. Then by cross coupling stages 1 through 25 are turned off. As a result, if the shift register 174 was not previously in the proper condition to receive the next transmission, the input on lead 176 immediately drives it to that condition before the incoming stenographic character arrives. Alternatively, stages 1 through 25 could be cleared simultaneously by connecting them in parallel to a clearing pulse source, whereby one pulse would clear the entire register, rather than 25 pulses in series.

The "beginning of frame" pulse on line 125 is also applied to set a flip-flop 180. The set output of that flip-flop then enables a coincidence gate 182 which allows the data input on line 125 to reach a group of coincidence gates 172. The same set output also enables another coincidence gate 184 which allows a stream of pulses from an oscillator 186 and a pulse shaper 188 to be applied over a lead 190 for advancing the shift register 174. As a result the shift register advances from stage 26 to stages 1 through 25 in sequence, thereby gating the 25 bits through the respective gates 172 in succession to distribute them over respective output leads 128. These leads are connected to the Stenotype readout device 130, which interprets the 25 bits as a stenographic character. The switching delay of flip-flop 180 suffices to make sure that the "beginning of frame" pulse applied over lead 176 prepares the shift register 174 for the incoming transmission before the flip-flop 180 enables the gates 182 and 184 to start a data reception cycle.

The frequencies of oscillators 146 and 186 must, of course, be the same, and the commutating circuit 118 and decoder 126 must be so arranged that the "beginning of frame" pulse sets the flip-flop 180 in time to enable the gates 182 and 184 as the data pulses begin arriving from the gates 140. The delay circuit 149, which serves a purpose described above in connection with the internal operation of the commutator circuit 118, also helps in this respect.

After transmission of 25 bits, the next pulse on lead 190 advances the shift register 174 to stage 26 thereof, whereupon an output appears on lead 192 to reset the flip-flop 180. This disables the gate 184 to prevent any further advance of the shift register 174, which now remains at stage 26 to be ready for the next data transmission. The resetting of flip-flop 180 also disables gate 182. As a result, the next "beginning of frame" pulse appearing on lead 125 will not be applied to any of the gates 172 as if it were one of the 25 data bits, but will be applied only to set the flip-flop 180 and resynchronize the shift register 174 by turning on stage 26. Of course, the receiver need not be gates as described; an ungated receiver can be employed and synchronization will be achieved by means wholly at the receiver end, as, for example, by an RC integrating cir- In general terms, the embodiment of FIG. 3 comprises the identical Stenotype keyboard 110 of FIGS. 1 and 2 transmitting 25 bits of Stenotype character information in bit parallel form over the same lines 112 to a storage device 314. A commutating device 318 then samples the stored bits in sequence and distributes them in bit serial form over a line 320 to the same data link 124, accomplishing this under control of a circuit 322. The data link 124 transmits the incoming data over a line 325 to a decoding circuit 326 which then distributes the respective bits of information over 25 output lines 328. These output lines would normally be connected to the identical Stenotype readout device 130 seen in FIGS. 1 and 2.

Once again, the Stenotype keyboard 110 comprises 25 keys 132 operating respective switches 134 which connect power source terminal 136 to the output lines 112. In this embodiment, however, the storage devices 338 are 25 latching relays with their latching inputs connected to the respective leads 112. Accordingly, for each actuation of a key 132 of the Stenotype keyboard 110, a latching coil 201 of one of the relays 338 of the storage device 314 latches its relay switch 212 to store the key actuation information.

The potential applied to the respective leads 112 upon key actuation is also connected over leads 354 via diodes 356 to energize relay coils 200 and 202. Note that these relay coils are energized in parallel as soon as any one or more of the keys 132 are actuated. When this happens the coil 200 is effective to close and latch a normally open switch 360 which is connected in series between power terminals 204 and a commutator drive motor 346. However the circuit to the motor 346 is not immediately completed, because at the same time the relay coil 202 is effective to open a normally closed switch 364 also in series between the power terminals 204 and the drive motor 346. Thus the switch 360 is latched to prime the motor energizing circuit upon initial closing of any of the key-actuated switches 132, but the switch 364 is simultaneously opened to delay the effect of closing switch 364 until after all the actuated keys 132 have been released. When that happens, relay coils 200 and 202 are deenergized. Deenergization of coil 200 does not reopen switch 360, because the latter has been latched. However, deenergization of coil 202 does reclose switch 364, completing the circuit to the commutator drive motor 346.

Thus, after the actuation of keys 132 to represent a stenographic character, the release of those keys completes the motor energization circuit, whereupon the motor 346 rotates the mechanical commutator 342 (arrow 205). The commutator has 27 terminals, and in making one complete revolution it first samples terminals 1 through 25 to connect the outputs of relays 338 sequentially to the commutator rotor 206. A power source terminal 208 is connected by means of lead 210 to each of the switches 212 of respective relays 338. If a particular relay 338 has not been latched closed, the associated switch 212 is open, and no voltage is applied to the associated terminal 1 through 25 of commutator 342. But for each relay 338 which has been latched closed by an input on the lead 112, the voltage on terminal 208 is applied by the associated gizes a coil 222 which unlatches the motor energization switch 360. This opens the circuit of motor 346 and thus terminates the rotation of the commutator 342. The rotor 206 comes to rest in contact with terminal 27, and is thus in condition for the next commutation cycle.

Clearly, rather than energizing and deenergizing motor 346, other means could be provided for driving and keeping stationary rotor 206. Thus, for example, an electromagnetic clutch could be interposed between a continuously operable motor and rotor 206 in which case the clutch would be controlled by contact 364 of relay 202.

The coil 222 also unlatches switch 220 when the commutator rotor 206 reaches terminal 27. As a result, when the next stenographic character transmission cycle begins, the lead 366 is no longer connected through to the commutator terminal 27, and thus cannot cause immediate unlatching of the storage relays 338 as soon as a bit is stored therein by actuation of the keys 132. Similarly, the lead 323 is disconnected from the commutator terminal 27 in order that coil 222 not unlatch switch 360 immediately after it is latched by coil 200 upon the next actuation of a key or keys 132. Thus, the function of commutator terminal 27 is to perform the unlatching function, while that of commutator terminal 26 is to prevent terminal 27 from performing that function at the beginning of a character transmission cycle, and enable it to do so at the end of the cycle.

Switches 360 and 364 bear a clear analogy to flip-flops 160 and 164 of FIG. 2, in that switch 364 energizes the motor 346 to drive commutator 342, but only after it is permitted to do so by the latching of switch 360. Accordingly the motor is energized only after the depression of one or more keys 132, followed by the release of all such keys.

The circuit from one of the power source terminals 204 through switches 360 and 364 is also completed over a lead 224 to terminal 27 of the commutator 342. The purpose of this branch of the circuit is to transmit a "beginning of frame" pulse as soon as the switches 360 and 364 are both closed to signal the beginning of a character transmission cycle.

When the "beginning of frame" pulse is transmitted by data link 124 over lead 325 to the decoder 326, it is applied over lead 226 through a normally closed switch 228 to energize a relay coil 230 which closes and latches a normally open switch 232. That switch then completes the circuit from power source terminals 234 to a drive motor 386 which drives a commutator 374 so that rotor 236 thereof rotates in the direction indicated by the arrow 238. At this time, coil 230 also opens and latches an isolating switch 228 to disconnect itself from terminal 27.

The commutator 374 has 27 terminals. Initially the rotor 236 is in contact with terminal 27, but at that time a normally open switch 240 isolates terminal 27 from an unlatching coil 242. As the motor 386 drives the commutator 374, the rotor 236 distributes the 25 bits of information to commutator terminals 1 through 25, to which respective output leads 328 are connected. In this manner the 25 individual bits of each Stenotype character are distributed to the 25 respective inputs of the remote Stenotype readout 130, just as in FIGS. 1 and 2.

The commutators 342 and 374 of course turn at the same speed, and are synchronized on a terminal-for-terminal basis so that both rotors 206 and 236 contact the same numbered terminal at the same time. After sampling their respective terminals 1 through 25 which communicate data bits, the rotors next contact their respective terminals 26. When the rotors are at this position, the latching pulse which energizes coil 218 of circuit 318 develops a voltage across load resistor 214 which is transmitted via data link 124 and serves to pulse a latching coil 244 in the decoding circuit 326. This coil then closes and latches a normally open switch 240 to complete a path from terminal 27 to the unlatching coil 242. Accordingly, on the next step of the commutator rotors 206 and 236, when they both contact their respective terminals 27, the current drawn through switch 220 of the circuit 318 develops a voltage across load resistor 214 which is transmitted over data link 124 to energize the unlatching coil 242 via the now closed switch 240. At this time the voltage applied to terminal 27 of commutator 374 does not affect the latching coil 230, which has been cut out of the circuit by the isolating switch 228 which had been previously latched in the open position.

Upon energization, the unlatching coil 242 releases switches 232, 228 and 240. When switch 232 opens it terminates operation of motor 386 to stop the commutator rotor 236 in its present position. This leaves the rotor resting on terminal 27, in condition for the next stenographic character transmission. The release of switch 228 recloses the circuit to the latching coil 230 so that the "beginning of frame" pulse which starts the next stenographic character transmission will be effective to energize that coil. Finally, the opening of switch 240 opens the circuit to the unlatching coil 242 so that the "beginning of frame" pulse which starts the next character transmission will not energize the coil 242. Subsequently, of course, as the rotor 206 goes through the next cycle and comes to terminal 26, it will reclose switch 240 and thereby permit the unlatching coil 242 to be energized as required at the end of a character transmission cycle.

Figure 3:
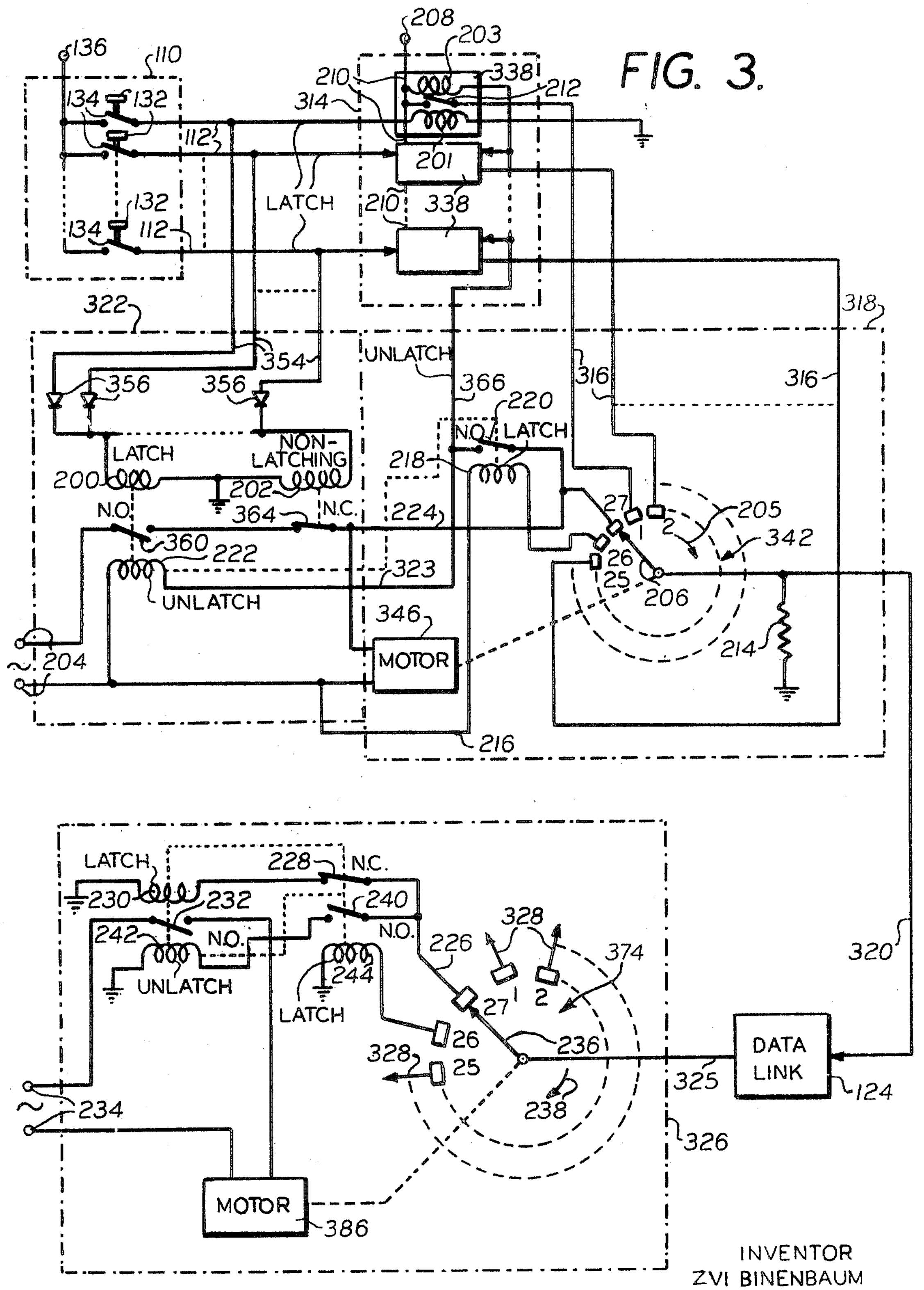
FIG. 3 is a schematic electrical circuit diagram illustrating an alternative embodiment of a Stenotype data communication system in accordance with the invention.

It will now be appreciated that the embodiment of FIG. 3 accomplishes essentially the same function as that of FIGS. 1 and 2, but does so almost exclusively by the use of electromechanical switching devices. One exception to this is the use of the diodes 356 of control circuit 322 in FIG. 3 to buffer the input to relay coils 200 and 202. These diodes constitute an OR gate which is electronic in nature. An alternative approach would be to provide a different type of Stenotype keyboard 410 as seen in FIG. 4. Here each of the keys 432 actuates two switches 434 and 298 connected to a common power source terminal 436. The switches 434 are connected to respective leads 412, analogous to the leads 112 of the previous figures, which serve to latch the respective storage relays. In FIG. 4 all elements which are clearly analogous to those of previous embodiments are given a reference numeral in the 400 range having the same last two digits as the reference numeral of the analogous element in the preceding figures, while reference numerals in the 200 range are used for all other elements.

The switches 298 are all connected in common to a lead 454 so that the latching coil 400 and nonlatching coil 402, analogous to coils 200 and 202 respectively of FIG. 3, are both energized whenever one or more of the keys 432 is depressed, and are deenergized whenever all those keys are released. Just as in the previous embodiment, the latching of a switch by coil 400 is followed by the release of a nonlatching switch by coil 402 so that character transmission takes place only at the termination of a cycle of key actuation representing a stenographic character.

It will now be appreciated that the present invention provides stenographic data communication apparatus which circumvents the inherent incompatibility between the bit parallel form of Stenotype data and the bit serial form required for the use of a single telephone data transmission line. Moreover, the apparatus accomplished this, and performs the necessary data conversion at both the transmitting and receiving ends of the data link, under precise control of the manual Stenotype keyboard. This enables the stenographer to proceed at his own speed, knowing that the machine will not transmit a stenographic character until that character has been fully formed, as signified by the release of all keys. Nevertheless, the apparatus is able to distinguish between the release of keys when that event has data significance, and the mere rest condition of the keys between character transmission cycles.

While the present invention has numerous applications for remote transmission of information at high speeds and using standard telephone service, one area of special interest and application for the present invention is in the field of transcript recording. Thus a stenotype operator in a courtroom could operate a transmitter constructed in accordance with the present invention whereby to have the information immediately available in a separate part of the courthouse or elsewhere for translation into English or other language. In the alternative, a specially programmed computer could be added on at the receiving end to make a substantially instantaneous and automatic translation from stenotype to English or other language. This would greatly facilitate the preparation of so-called "daily copy" during court trials.

In addition, the depositions of witnesses taken in lawyers' offices could be quickly transcribed by connecting a transmitter constructed in accordance with the present invention directly into a standard telephone line, the other end being located at a remote office for reception of the transmitted information and for subsequent translation. Thus the entire field of court reporting can be greatly speeded up by using the present invention.

Naturally, this is only one specialized application for this general improvement in data recording and transmission and this invention is in no way to be construed as limited to this specialized application or use.

The invention I claim is:

1. Data communication apparatus comprising: a keyboard including a plurality of keys which are actuatable simultaneously to create a data message, and respective switches operable by said keys; respective means responsive to said switches to store said data representing said simultaneous key actuation; a data transmission output line; commutating means for connecting said storage means sequentially to said line to transmit said simultaneous key actuation data in bit serial form; means for starting said commutating means in response to a control sequence comprising said simultaneous actuation of said plurality of keys followed by a release of all of said plurality of keys simultaneously actuated; and means for thereafter stopping said commutating means at the end of a single cycle of commutation covering all of said storage means.

2. Apparatus as in claim 1 wherein said commutating means comprises a shift register including at least one stage per storage means, respective means connected to gate said data from said storage means to said line and connected to be enabled by respective shift register stages, and a repetitive pulse source for advancing said shift register.

3. Apparatus as in claim 2 wherein: said starting means comprises detecting means responsive to the simultaneous actuation of said plurality of keys, means for gating said advancing pulses to said shift register; bistable means for enabling said gating means; latchable means for switching on said bistable means upon unlatching thereof; and means responsive to said detecting means upon the simultaneous actuation of said plurality of keys to latch said latchable means, and responsive to said detecting means upon the subsequent release of all of said simultaneously actuated keys to unlatch said latchable means whereby to switch on said bistable means, thereby enabling said gating means and advancing said shift register; and said stopping means is responsive to the termination of a commutation cycle of said shift register to switch off said bistable means.

4. Apparatus as in claim 1 wherein: said commutation means comprises a rotating mechanical device, and means for driving said device; said starting means comprises first and second switches in series for operating said driving means, means for latching said first switch closed in response to the simultaneous actuation of said plurality of keys, and means for closing said second switch in response to the subsequent release of all of said simultaneously actuated keys; and said stopping means comprises means for unlatching said first switch at the termination of a commutating cycle.

5. Data communication apparatus comprising: a keyboard including a plurality of keys which are actuatable simultaneously to create a data message, and respective switches operable by said keys; respective means responsive to said switches to store said data representing said simultaneous key actuation; a data transmission output line; commutating means for connecting said storage means sequentially to said line to transmit at least a portion of said simultaneous key actuation data in bit serial form; means for starting said commutation means in response to a control sequence comprising said simultaneous actuation of said plurality of keys followed by a release of at least a portion of said simultaneously actuated keys; and means for thereafter stopping said commutating means at the end of a single cycle of commutation covering the portion of said storage means associated with at least the last mentioned portion of said simultaneously actuated keys.